US006634945B2

(12) United States Patent
Glavich et al.

(10) Patent No.: US 6,634,945 B2
(45) Date of Patent: Oct. 21, 2003

(54) GAMING DEVICE HAVING INDEPENDENT BONUS REELS

(75) Inventors: Paulina Glavich, Reno, NV (US); Joseph E. Kaminkow, Reno, NV (US); Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 09/967,266

(22) Filed: Sep. 28, 2001

(65) Prior Publication Data

US 2003/0064796 A1 Apr. 3, 2003

(51) Int. Cl.$^{7}$ ................................................ A63F 13/00
(52) U.S. Cl. ......................... 463/25; 463/20; 273/138.2
(58) Field of Search .............................. 463/20, 16–19, 463/21–22, 13, 25–27, 30; 273/143 R, 139, 138.1, 138.2, 269, 292–293

(56) References Cited

U.S. PATENT DOCUMENTS

| | | | | |
|---|---|---|---|---|
| 4,448,419 A | | 5/1984 | Telnaes | |
| 4,618,150 A | | 10/1986 | Kimura | |
| 4,695,053 A | | 9/1987 | Vazquez, Jr. et al. | |
| 5,205,555 A | | 4/1993 | Hamano | |
| 5,393,061 A | | 2/1995 | Manship et al. | |
| 5,449,173 A | | 9/1995 | Thomas et al. | |
| 5,456,465 A | | 10/1995 | Durham | |
| 5,611,535 A | | 3/1997 | Tiberio | |
| 5,722,891 A | | 3/1998 | Inoue | |
| 5,752,881 A | | 5/1998 | Inoue | |
| 5,788,573 A | | 8/1998 | Baerlocher et al. | |
| 5,823,874 A | | 10/1998 | Adams | |
| 5,848,932 A | | 12/1998 | Adams | |
| 5,851,148 A | | 12/1998 | Brune et al. | |
| 5,882,261 A | | 3/1999 | Adams | |
| 5,890,962 A | | 4/1999 | Takemoto | |
| 5,911,418 A | | 6/1999 | Adams | |
| 5,934,998 A | | 8/1999 | Forte et al. | |
| 5,947,820 A | | 9/1999 | Morro et al. | |
| 6,004,207 A | | 12/1999 | Wilson, Jr. et al. | |
| 6,015,346 A | | 1/2000 | Bennett | |
| 6,033,307 A | * | 3/2000 | Vancura | 463/20 |
| 6,059,658 A | | 5/2000 | Mangano et al. | |
| 6,062,980 A | | 5/2000 | Luciano | |
| 6,089,978 A | | 7/2000 | Adams | |
| 6,095,921 A | | 8/2000 | Walker et al. | |
| 6,142,873 A | | 11/2000 | Weiss et al. | |
| 6,162,121 A | | 12/2000 | Morro et al. | |

(List continued on next page.)

FOREIGN PATENT DOCUMENTS

| | | |
|---|---|---|
| EP | 0 874 337 A1 | 10/1998 |
| EP | 0 945 837 A2 | 9/1999 |
| EP | 0 984 409 A2 | 8/2000 |

OTHER PUBLICATIONS

Texas Tea Advertisement written by IGT, published in 2000.
On the Money Article written by Strictly Slots, published in 2000.

(List continued on next page.)

*Primary Examiner*—Mark Sager
*Assistant Examiner*—Aaron Capron
(74) *Attorney, Agent, or Firm*—Bell, Boyd & Lloyd LLC

(57) ABSTRACT

The present invention is directed to a gaming device having a plurality of reels each having a plurality of award symbols, a terminating condition, at least one award indicator and a processor connected to the reels. The processor activates the reels and randomly stops one of the reels. An award is provided to the player if an award symbol is indicated on the stopped reel. If a terminating condition occurs with respect to a reel, the reel is deactivated. If a terminating condition does not occur, the processor re-activates the reel. The gaming device continues to activate the reels until all of the reels are deactivated. The player then receives the total accumulated award for the bonus game.

84 Claims, 11 Drawing Sheets

U.S. PATENT DOCUMENTS

| | | | |
|---|---|---|---|
| 6,165,071 | A | 12/2000 | Weiss |
| 6,168,520 | B1 | 1/2001 | Baerlocher et al. |
| 6,173,955 | B1 | 1/2001 | Perrie et al. |
| 6,174,235 | B1 | 1/2001 | Walker et al. |
| 6,190,254 | B1 | 2/2001 | Bennett |
| 6,190,255 | B1 | 2/2001 | Thomas et al. |
| 6,224,483 | B1 | 5/2001 | Mayeroff |
| 6,227,971 | B1 | 5/2001 | Weiss |
| 6,231,442 | B1 | 5/2001 | Mayeroff |
| 6,270,408 | B1 | 8/2001 | Sakamoto et al. |
| 6,270,411 | B1 | 8/2001 | Gura et al. |
| 6,270,412 | B1 | 8/2001 | Crawford et al. |
| 6,299,165 | B1 | 10/2001 | Nagano |
| 6,309,300 | B1 | 10/2001 | Glavich |
| 6,315,660 | B1 | 11/2001 | DeMar et al. |
| 6,315,663 | B1 | 11/2001 | Sakamoto |
| 6,334,814 | B1 | 1/2002 | Adams |
| 6,364,768 | B1 | 4/2002 | Acres et al. |

OTHER PUBLICATIONS

Wheel of Fortune Advertisement written by IGT, published 1997.

Price is Right Advertisement written by IGT, published in 2001.

Fortune Cook Advertisement written by IGT, published in 2000.

Psycho Cash Beast Advertisement written by IGT, published in 1999.

Bonus Spin Advertisement written by IGT, published prior 2000.

Little Devils Advertisement written by IGT, published in 2000.

Winning Streak Advertisement written by Aristocrat, published in 1994.

Double Diamond Run Advertisement written by IGT, published in 2001.

* cited by examiner

GAMING DEVICE HAVING INDEPENDENT BONUS REELS

CROSS REFERENCE TO RELATED APPLICATIONS

The present invention relates to the following commonly owned U.S. patent applications: "GAMING DEVICE HAVING SEPARATELY CHANGEABLE VALUE AND MODIFIER BONUS SCHEME," Ser. No. 09/626,045, "GAMING DEVICE HAVING A SELECTIVELY ACCESSIBLE BONUS SCHEME," Ser. No. 09/657,916, "GAMING DEVICE HAVING BONUS SCHEME WITH INCREMENTAL VALUE DISCLOSURE," Ser. No. 09/627,198, "GAMING DEVICE HAVING A MULTIPLE SELECTION GROUP BONUS ROUND," Ser. No. 09/605,107, "GAMING DEVICE WITH A BONUS SCHEME INVOLVING MOVEMENT ALONG PATHS WITH PATH CHANGE CONDITIONS," Ser. No. 09/686,538, "GAMING DEVICE HAVING RELATED MULTI-GAME BONUS SCHEME," Ser. No. 09/688,972, "Gaming Device Having Independent Reel Columns," Ser. No. 09/688,428, "GAMING DEVICE HAVING AN ORDERED DESIGNATION OF BONUS VALUES IN MULTIPLE VALUE SETS," Ser. No. 09/978,913, "GAMING DEVICE INCLUDING CHOICES HAVING VARYING PROBABILITIES OF CONTRIBUTING TO GAME'S TERMINATION," Ser. No. 09/957,308, "GAMING DEVICE HAVING A BONUS SCHEME WITH MULTIPLE POTENTIAL AWARD SETS," Ser. No. 09/822,697, "APPARATUS AND METHOD FOR MODIFYING GENERATED VALUES TO DETERMINE AN AWARD IN A GAMING DEVICE," Ser. No. 09/957,018, and "GAMING DEVICE HAVING OFFER/ACCEPTANCE ADVANCE THRESHOLD AND LIMIT BONUS SCHEME," Ser. No. 09/838,014.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates in general to a gaming device, and more particularly to a gaming device having independent bonus reels.

Gaming devices provide enjoyment and excitement to players, in part, because they may ultimately lead to monetary awards for the players. Gaming devices also provide enjoyment and excitement to the players because they are fun to play. Bonus games, in particular, provide gaming device manufacturers with the opportunity to add enjoyment and excitement to that which is already expected from a base game of the gaming device. Bonus games provide extra awards to the player and enable the player to play a game that is different than the base game.

Known gaming devices having bonus games employ a triggering event that occurs during play of the base game operation of the gaming device. The triggering event temporarily stalls or halts the base game play and enables a player to enter a second, different game, which is the bonus game. The player plays the bonus game, likely receives an award, and returns to the base game. In most instances, the bonus game is relatively short in relation to the time that the player spends repeatedly playing the base game. The player may play the bonus game several times while playing the base game of the gaming device.

Different types of bonus games are described in European Patent Application No's EP 0874337A1, EP 0945837A2 and EP 0984409A2, each of which are assigned to WMS Gaming, Inc. These games are generally versions of a "Do Until" type bonus game.

Patent Application No. EP 0874337A1 discloses a gaming device having a bonus game where the player spins a plurality of reels including several symbols. In the bonus game, if the player obtains a winning symbol combination on the reels, the player receives an award and spins again. The probability for obtaining a winning symbol combination on the reels is greater than fifty percent. Therefore, a player will likely have multiple opportunities to spin the reels in the bonus game and receive several awards. If the player does not obtain a winning symbol combination, the bonus game ends and the player receives the total accumulated award for the game. Thus, the player spins the reels in the bonus game until the player does not obtain a winning combination.

Patent Application No. EP 0984409A2 discloses a gaming device wherein the game enables the player to spin a plurality of reels having various symbols attempting to obtain awards. In this bonus game, the player starts the bonus game with a limited number of spins. Then, the player spins the reels until there are no spins remaining. The player receives an award after each spin. The final award in the bonus game is the total of all of the accumulated awards by the player in the game.

Patent Application No. EP 09454837A2 discloses a gaming device wherein the game presents the player with a plurality of selections in the bonus game. The selections include masked or hidden awards and end bonus outcomes or terminators. The player receives an award for each selection picked by a player that is not a terminator. The player continues to pick selections until the player selects a terminator. The terminator ends the bonus game and the player receives the total of all the awards they obtained during the game.

The above gaming machines employ a "Do-Until" style bonus game where a player spins reels or picks from a player selectable grid or board until the player obtains a terminator or runs out of picks. In these games, players can obtain multiple awards. While such bonus games offer advantages in player appeal and excitement, there is a continuing need to develop new types of bonus games that allow players to accumulate larger awards and increase the level of player excitement and enjoyment.

SUMMARY OF THE INVENTION

The present invention provides a gaming device and in particular a bonus game of a gaming device that enables players to accumulate awards by spinning a plurality of independent reels having a plurality of award symbols at least one award indicator associated with each reel. The reels are independently activated and deactivated. Additionally, in one embodiment, a terminating condition is associated with each reel. It should be appreciated, however, that the terminating condition may be associated with a plurality of reels, all of the reels or none of the reels. In one embodiment, the terminating condition deactivates a reel when a terminator or terminator symbol is indicated on the reel. In this embodiment, the gaming device starts the game by activating all of the reels displayed to the player and then randomly stops one of the reels. It should be appreciated that activation of the reels includes, but is not limited, spinning mechanical reels, or simulating the spinning of the reels on a video display device. If an award symbol is indicated on the stopped reel, the gaming device provides the player with an award associated with the indicated award symbol. The gaming device then re-activates the reel. If a terminator symbol is indicated on the reel the gaming device deactivates the reel and that reel is not activated again in the bonus game. The gaming device continues to re-activate the other reels and provide awards to the player until all of the reels are deactivated. The gaming device provides the total accumulated award to the player and the bonus game ends.

In another embodiment, the gaming device randomly selects and activates one reel. If an award symbol is indicated on the reel when the reel stops the gaming device provides an award to the player. The gaming device then randomly selects and activates another reel. It should be appreciated that the gaming device may subsequently activate the same reel or a different reel. If a terminating condition occurs, the gaming device does not provide an award to the player and deactivates that reel. It should also be appreciated that a terminating condition such as a terminator symbol may be associated with an award. Furthermore, once a reel is deactivated, the reel may no longer be re-activated in the game. The bonus game continues as described above until a terminator symbol is indicated on each reel. Therefore, the bonus game ends when all the reels are deactivated.

In another embodiment, a plurality of terminators or terminator symbols are included on the reels. Each reel may have one or more terminator symbols. The additional terminator symbols increase the likelihood that a player will receive a terminator.

In another embodiment, a probability of deactivation or a deactivation probability is associated with each reel. It should be appreciated that an equivalent or corresponding probability of activation may be associated with each reel instead of a probability of deactivation. The gaming device randomly determines whether a stopped reel will be re-activated based on the deactivation probability associated with the stopped reel. A reel with a higher deactivation probability will be less likely to be re-activated by the processor than a reel with a lower deactivation probability. When all of the reels are deactivated, the game ends. In one embodiment, the probability of deactivation associated with a reel increases after each activation of that reel. In another embodiment, the probability of deactivation of a reel increases after a plurality of activations of that reel. One or more deactivation probabilities may alternatively be used for one or more of the independently activated reels.

In a further embodiment, the terminating condition is determined by the processor where the processor randomly determines a number of activations for each reel. When the number of activations of a reel equals the determined number of activations for that reel, the reel is deactivated. The game ends when all of the reels are deactivated.

In another embodiment, the terminating condition is determined by the processor where the processor randomly determines a total number of activations for a game. The processor ends the game when the total number of activations in the game equals the determined total number of activations for that game.

In a further embodiment, the processor provides an award to a player if the player reaches a pre-determined number of activations for a reel before a terminating condition occurs for that reel. In another embodiment, the processor provides an award to a player if the player reaches a pre-determined number of activations for a plurality of reels before a terminating condition occurs for the plurality of reels. In a further embodiment, the processor provides an award to a player if the player reaches a pre-determined total number of activations in a game before all of the reels are deactivated and the game ends.

In another embodiment, the reels and the award symbols are associated with probabilities of being indicated and the terminating conditions are associated with probabilities of occurring such that one reel, award symbol or terminating condition has a greater probability of being indicated or occurring in a game than another reel, award symbol or terminating condition.

In a further embodiment, the gaming device includes reels having relatively low award values and reels having relatively large award values. The reels are associated with activation probabilities such that the probability of the gaming device activating a reel having relatively low award values is higher than the probability of the gaming device activating a reel having relatively large award values. Thus, each of the different reels can have different awards, different probabilities associated with the awards, and different probabilities associated with the reels.

In another embodiment, a number of activations is determined by the processor and associated with at least one reel in the bonus game. The number of activations may be associated with one reel, a plurality of reels or all of the reels. Furthermore, the number of activations may be the same for each reel or different for each reel. The processor deactivates a reel or reels, when the number of activations occurs for that reel or reels. When all of the reels are deactivated the bonus game ends.

In a further embodiment, a probability of deactivation is associated with at least one reel where the processor determines whether to deactivate a reel based on the probabilities. The deactivation probability may be the same or different for each reel. In one embodiment, the deactivation probability increases after each activation of a reel or after a plurality of activations of a reel or reels. In another embodiment, a number of activations is associated with a reel, a plurality of reels or all of the reels. In this embodiment, the player receives an award if the number of activations occurs for the reel, plurality of reels or all of the reels.

In another embodiment, the awards associated with the award symbols on the reels increment by a predetermined or random amount after the gaming device re-activates the reels.

Although the present invention is discussed relative to a bonus game of a gaming machine, it should be appreciated that the present invention could be employed as a primary game in a gaming device.

It is therefore an advantage of the present invention to provide a gaming device having a plurality of independent bonus reels that include a plurality of award symbols and at least one terminating condition that deactivates a reel where a player obtains awards until all of the reels are deactivated.

It is another advantage of the present invention to provide players with several opportunities to accumulate and obtain larger awards.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
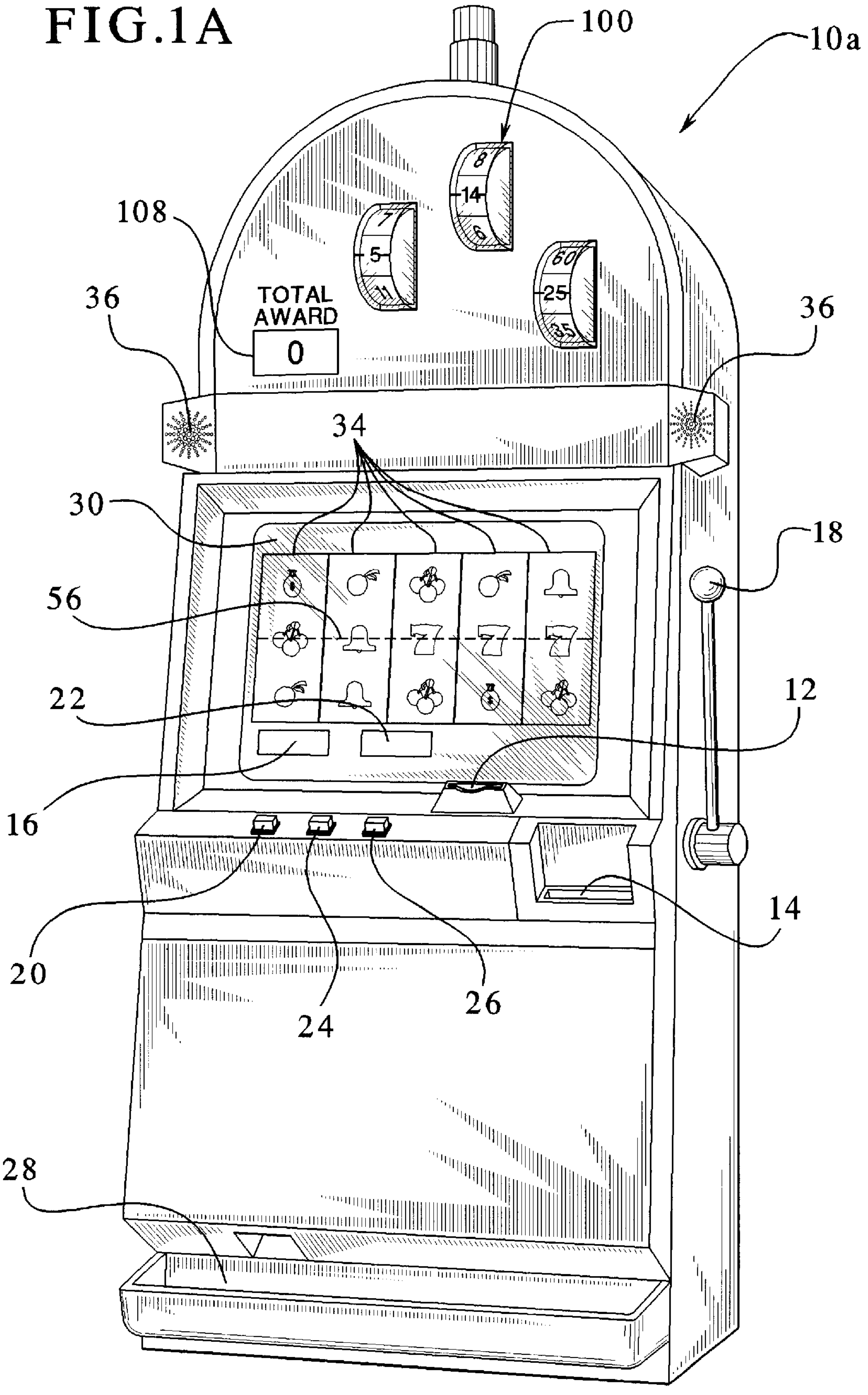
FIG. 1A is a front perspective view of one embodiment of the gaming device of the present invention.
Figure 1B:
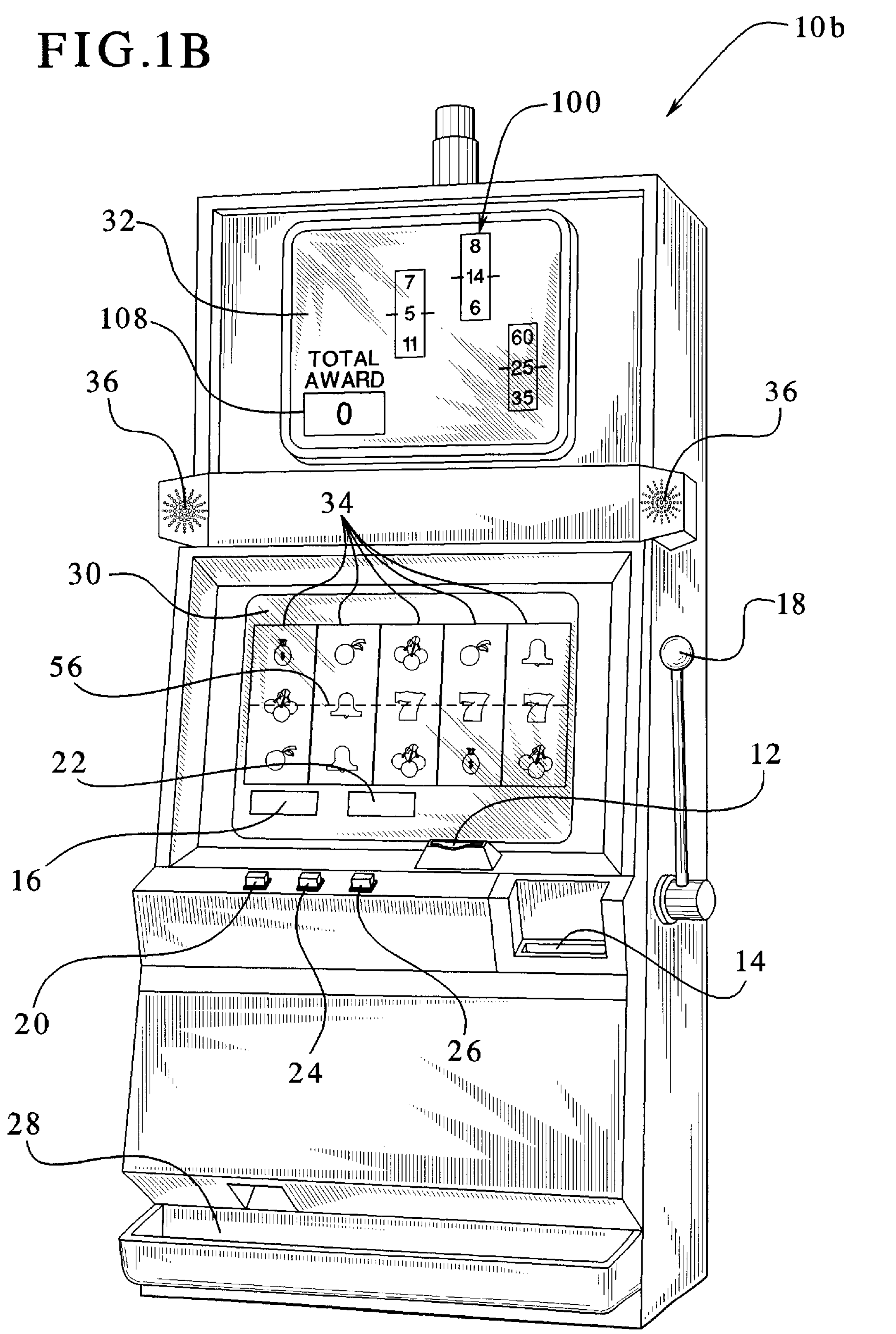
FIG. 1B is a front perspective view of another embodiment of the gaming device of the present invention.

Referring now to the drawings, and in particular to FIGS. 1A and 1B, gaming device 10*a* and gaming device 10*b* illustrate two possible cabinet styles and display arrangements and are collectively referred to herein as gaming device 10. The present invention includes the game (described below) being a stand alone game or a bonus or secondary game that coordinates with a base game. When the game of the present invention is a bonus game, gaming device 10 in one base game is a slot machine having the controls, displays and features of a conventional slot machine, wherein the player operates the gaming device while standing or sitting. Gaming device 10 also includes being a pub-style or table-top game (not shown), which a player operates while sitting.

The base games of the gaming device 10 include slot, poker, blackjack or keno, among others. The gaming device 10 also embodies any bonus triggering events, bonus games as well as any progressive game coordinating with these base games. The symbols and indicia used for any of the base, bonus and progressive games include mechanical, electronic or video symbols and indicia.

In a stand alone or a bonus embodiment, the gaming device 10 includes monetary input devices. FIGS. 1A and 1B illustrate a coin slot 12 for coins or tokens and/or a payment acceptor 14 for cash money. The payment acceptor 14 also includes other devices for accepting payment, such as readers or validators for credit cards, debit cards or smart cards, tickets, notes, etc. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. A player may "cash out" by pushing a cash out button 26 to receive coins or tokens in the coin payout tray 28 or other forms of payment, such as an amount printed on a ticket or credited to a credit card, debit card or smart card. Well known ticket printing and card reading machines (not illustrated) are commercially available.

Gaming device 10 also includes one or more display devices. The embodiment shown in FIG. 1A includes a central display device 30 having a plurality of mechanical reels 100 that physically spin in front of a player. An alternative embodiment shown in FIG. 1B includes a central display device 30 as well as an upper display device 32. The upper display device 32 displays the reels 100 of the present invention in a video format.

The display devices display any visual representation or exhibition, including but not limited to movement of physical objects such as mechanical reels and wheels, dynamic lighting and video images. The display device includes any viewing surface such as glass, a video monitor or screen, a liquid crystal display or any other static or dynamic display mechanism. In a video poker, blackjack or other card gaming machine embodiment, the display device includes displaying one or more cards. In a keno embodiment, the display device includes displaying numbers.

The slot machine base game of gaming device 10 preferably displays a plurality of reels 34, preferably three to five reels 34, in mechanical or video form on one or more of the display devices. As seen in FIG. 1C, one embodiment of the present invention includes more than one set of reels. Each reel set may be in video or mechanical form. Each reel 34 displays a plurality of indicia such as bells, hearts, fruits, numbers, letters, bars or other images which preferably correspond to a theme associated with the gaming device 10. If the reels 34 are in video form, the display device displaying the video reels 34 is preferably a video monitor. Each base game, especially in the slot machine base game of the gaming device 10, includes speakers 36 for making sounds or playing music.

Figure 2:
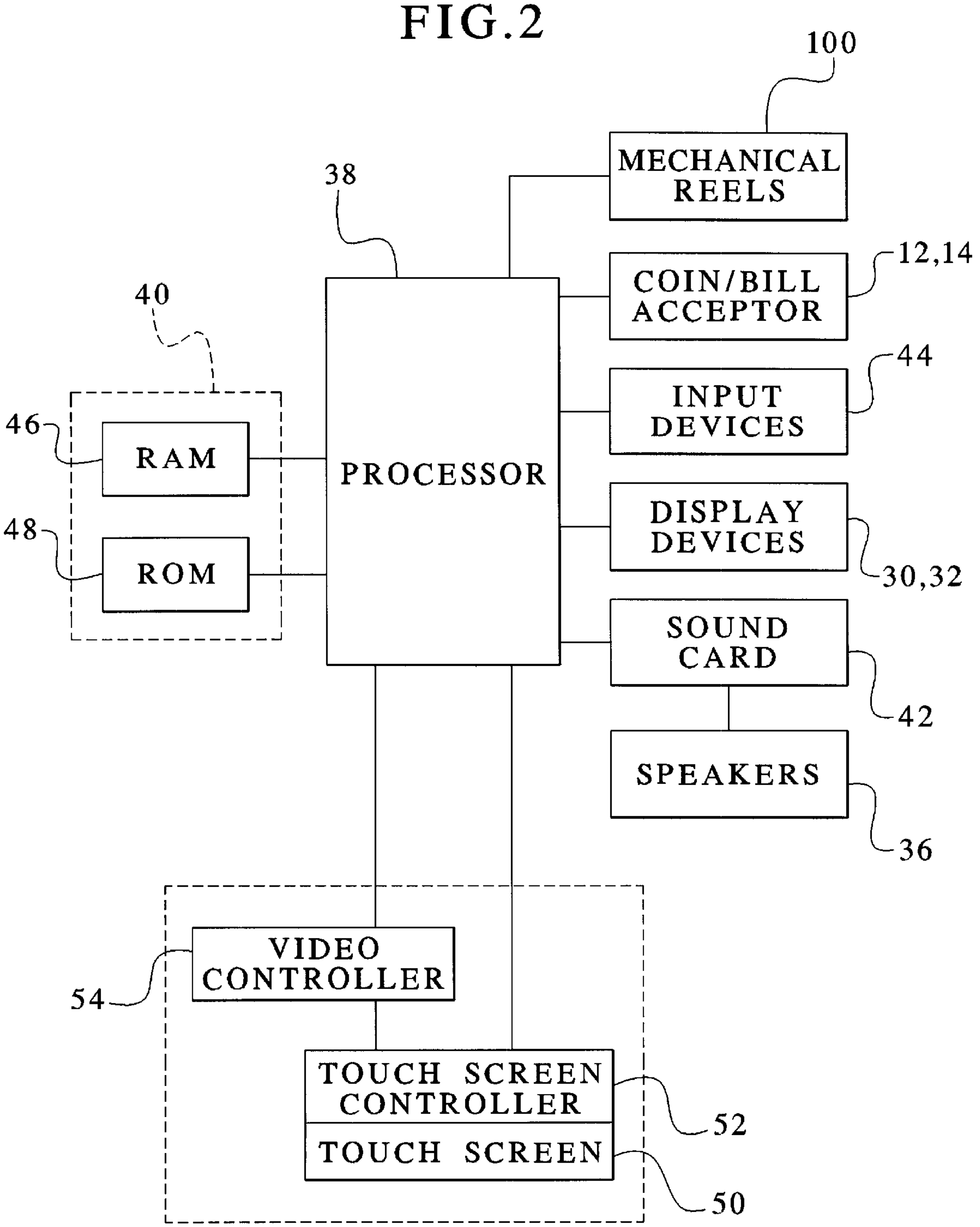
FIG. 2 is a schematic block diagram of the electronic configuration of one embodiment of the gaming device of the present invention.

Referring now to FIG. 2, a general electronic configuration of the gaming device 10 for the stand alone and bonus embodiments described above preferably includes: a processor 38; a memory device 40 for storing program code or other data; a central display device 30; an upper display device 32 or reels 100 in a mechanical format of the bonus game; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 includes random access memory (RAM) 46 for storing event data or other data generated or used during a particular game. The memory device 40 also includes read only memory (ROM) 48 for storing program code, which controls the gaming device 10 so that it plays a particular game in accordance with applicable game rules and pay tables.

As illustrated in FIG. 2, the player preferably uses the input devices 44 to input signals into gaming device 10. In the slot machine base game, the input devices 44 include the pull arm 18, play button 20, the bet one button 24 and the cash out button 26. A touch screen 50 and touch screen controller 52 are connected to a video controller 54 and processor 38. The terms "computer" or "controller" are used herein to refer collectively to the processor 38, the memory device 40, the sound card 42, the touch screen controller and the video controller 54.

In certain instances, it is preferable to use a touch screen 50 and an associated touch screen controller 52 instead of a conventional video monitor display device. The touch screen enables a player to input decisions into the gaming device 10 by sending a discrete signal based on the area of the touch screen 50 that the player touches or presses. As further illustrated in FIG. 2, the processor 38 connects to the coin slot 12 or payment acceptor 14, whereby the processor 38 requires a player to deposit a certain amount of money in to start the game.

It should be appreciated that although a processor 38 and memory device 40 are preferable implementations of the present invention, the present invention also includes being implemented via one or more application-specific integrated circuits (ASIC's), one or more hard-wired devices, or one or more mechanical devices (collectively referred to herein as a "processor"). Furthermore, although the processor 38 and memory device 40 preferably reside in each gaming device 10 unit, the present invention includes providing some or all of their functions at a central location such as a network server for communication to a playing station such as over a local area network (LAN), wide area network (WAN), Internet connection, microwave link, and the like.

With reference to the slot machine base game of FIGS. 1A and 1B, to operate the gaming device 10, the player inserts the appropriate amount of tokens or money in the coin slot 12 or the payment acceptor 14 and then pulls the arm 18 or pushes the play button 20. The reels 34 then begin to spin. Eventually, the reels 34 come to a stop. As long as the player has credits remaining, the player can spin the reels 34 again. Depending upon where the reels 34 stop, the player may or may not win additional credits.

In addition to winning base game credits, the gaming device 10, including any of the base games disclosed above, also includes bonus games that give players the opportunity to win credits. The gaming device 10 preferably employs a video-based display device 30 or 32 for the bonus games. The bonus games include a program that automatically begins when the player achieves a qualifying condition in the base game.

In the slot machine embodiment, the qualifying condition includes a particular symbol or symbol combination generated on a display device. As illustrated in the five reel slot game shown in FIGS. 1A and 1B, the qualifying condition includes the number seven appearing on, e.g., three adjacent reels 34 along a payline 56. It should be appreciated that the present invention includes one or more paylines, such as payline 56, wherein the paylines can be horizontal, diagonal or any combination thereof. An alternative scatter pay qualifying condition includes the number seven appearing on, e.g., three adjacent reels 34 but not necessarily along a payline 56, appearing on any different set of reels 34 three times or appearing anywhere on the display device the necessary number of times.

Bonus Game

Figure 3:
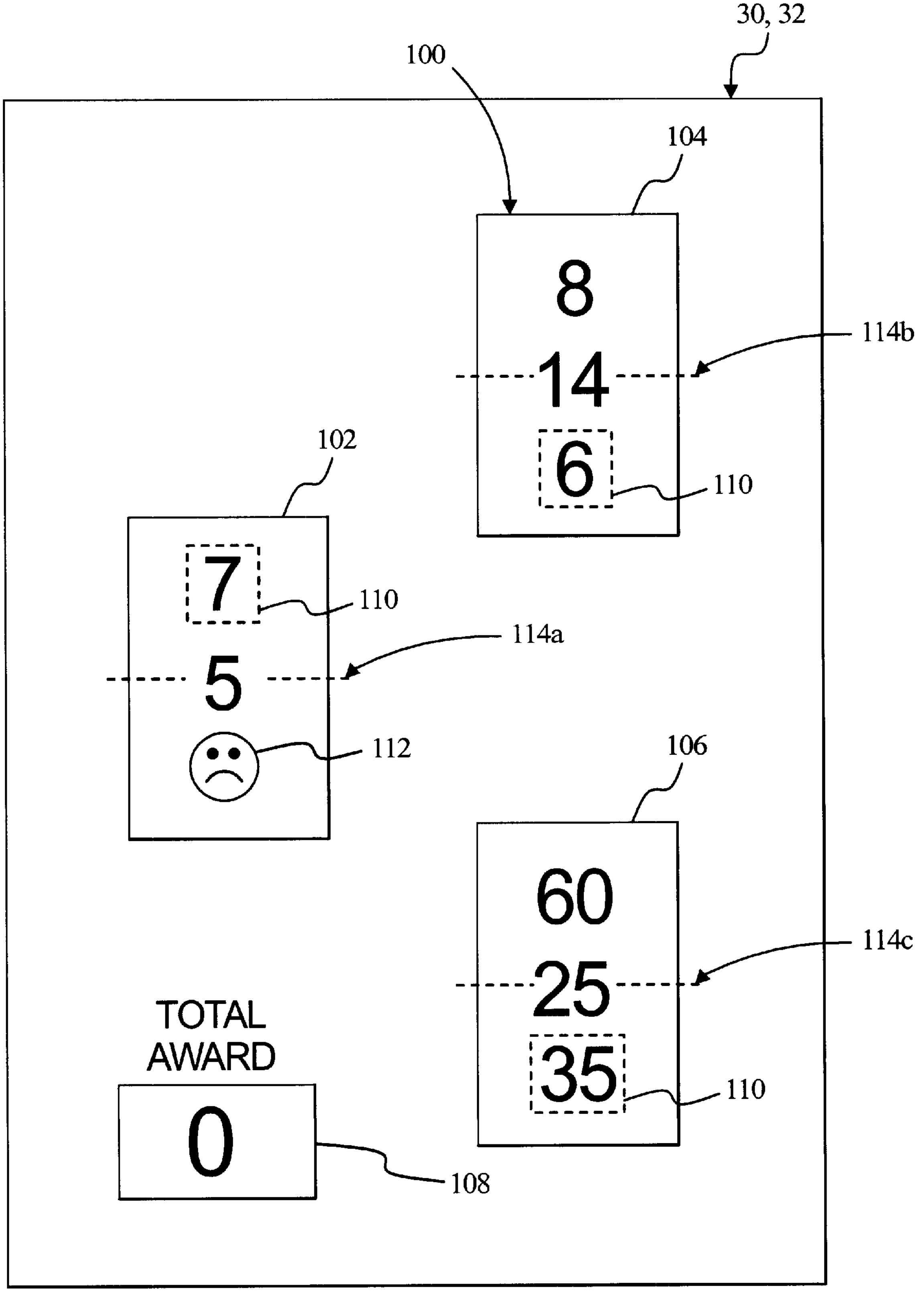
FIG. 3 is an enlarged elevation view of a display device illustrating one embodiment of the present invention wherein the display device includes three mechanical reels.

Referring now to FIG. 3, the gaming device 10 includes three independently activated reels 100. It should be appreciated however that the gaming device 10 may include any suitable number of reels desired by the game implementor. In one preferred embodiment, the reels 100 are mechanical reels mounted to the cabinet as generally illustrated in FIG. 1A. In another embodiment, the reels 100 are in a video format as generally illustrated in FIG. 1B. The reels 100 are positioned in any order or pattern as desired. In one embodiment, each reel 100 includes a plurality of award symbols 110 and a terminating condition such as a terminator or terminator symbol 112. The terminating condition deactivates a reel and the reel cannot be re-activated in the game. It should be appreciated that the terminating condition may be a terminator symbol associated with each reel. It should also be appreciated that the terminating condition may be based on a determination by the processor. It should be further appreciated that a terminating condition may be associated with a bonus game instead of one or more reels.

In one embodiment, each terminating condition is associated with a probability of occurring in a game such that the probability of one terminating condition occurring in a game is higher than another terminating condition occurring in a game. The probability of the terminating condition occurring may be higher than, equal to, or less than the probabilities of being indicated associated with an award symbol, a plurality of award symbols or all of the award symbols on the reels. Furthermore in another embodiment, the occurrence probability or probability of occurring associated with a terminating condition increases after each activation of a reel or reels, or after a plurality of activations of a reel or reels. The probability of occurring also may increase after a termination condition occurs in a game or after a plurality of terminating conditions occur in a game. It should be appreciated that the probability of occurring associated with a terminating condition may be the same for each reel, different for each reel or different for a plurality of reels.

An award indicator such as payline 114*a*, 114*b* and 114*c*, which indicates an award symbol 110 or a terminator symbol 112, is associated with each reel. In the illustrated embodiments, the gaming device includes three reels 100 which are designated as reels 102, 104 and 106. A total award display 108 displays the total award accumulated by a player in a game.

In one embodiment, the award symbols 110 are associated with awards that represent a number of credits to be provided to the player. However, it should be appreciated that an award does not have to be associated with each award symbol and that a multiplier, zero award, negative award or other type of modifier may be associated with one or more award symbols on the reels 100.

In one embodiment, the terminating condition is a terminator symbol or terminator 112 which ends the activation or deactivates a reel in a bonus game when the terminator symbol is indicated on the reel. The terminator symbol in FIG. 3 is illustrated as a frowning face, however, the terminator symbol may be designated with any symbol, character, image, design or sound as desired by the game implementor. In this embodiment, the reels 102, 104 and 106 each preferably include one terminator symbol 112. However, it should be appreciated that the reels 102, 104 and 106 may each include one or more terminator symbols as further discussed below.

An independent award indicator such as paylines 114*a*, 114*b*, or 114*c*, is associated with each reel 102, 104 and 106. The award indicators indicate a symbol on the reel. In this embodiment, each reel 102, 104 and 106 includes one payline 114*a*, 114*b*, and 114*c*, respectively. It should be appreciated however, each reel may include any suitable number of award indicators. It should also be appreciated that the award indicators may be any suitable indicator.

The gaming device preferably includes a total award display 108 which indicates the value of the bonus award that the player has accumulated at each point during the bonus game. When the bonus game ends, the bonus award identified in the award display 108 is transferred to the player's credit meter or display in a conventional manner.

In one embodiment of the present invention, the bonus game is triggered from a base game. The gaming device displays three reels 102, 104 and 106 to the player. The gaming device then activates or spins all three reels 102, 104 and 106 simultaneously. In this embodiment, the gaming device randomly stops one of the reels. When the selected reel stops an award symbol 110 or a terminator symbol 112 is indicated by an award indicator such as a payline, on that reel. If an award symbol is indicated, the award associated with the award symbol is transferred to the total award display 108. The gaming device then re-activates that reel. However, if a terminator symbol 112 is indicated on the payline, the reel is deactivated and the gaming device does not activate that reel during that remainder of the bonus game. It should be appreciated, however, that a terminating condition such as a terminator symbol 112 may deactivate one reel, a plurality of the reels, or all the reels in a bonus game. The gaming device continues to select and stop one reel from the three reels 102, 104 and 106, until a terminator symbol is indicated on the paylines of each reel. Once a terminator symbol 112 is indicated on each payline 114*a*, 114*b* and 114*c* on each reel 102, 104 and 106, respectively, the bonus game ends and the player receives the total award indicated in the total award display 108. It should be appreciated that the gaming device may activate one reel several times, alternately activate a plurality of reels, or activate any combination of reels.

Referring now to FIGS. 4A through 4G, an example of one embodiment of the present invention is illustrated where the gaming device activates three reels 102, 104 and 106 in a bonus game. In this example, the reels include award symbols 110 and terminating conditions, which are terminator symbols 112. The reels also include award indicators 114*a*, 114*b* and 114*c*, which are paylines. The award indicators indicate whether the player receives an award symbol 110 or a terminator symbol 112. Furthermore, the plurality of awards associated with each reel preferably vary in value. In this example, the lowest awards are associated with reel 102 and the largest awards are associated with reel 106. It should be appreciated that any suitable number and value of awards may be associated with each reel.

Figure 4A:
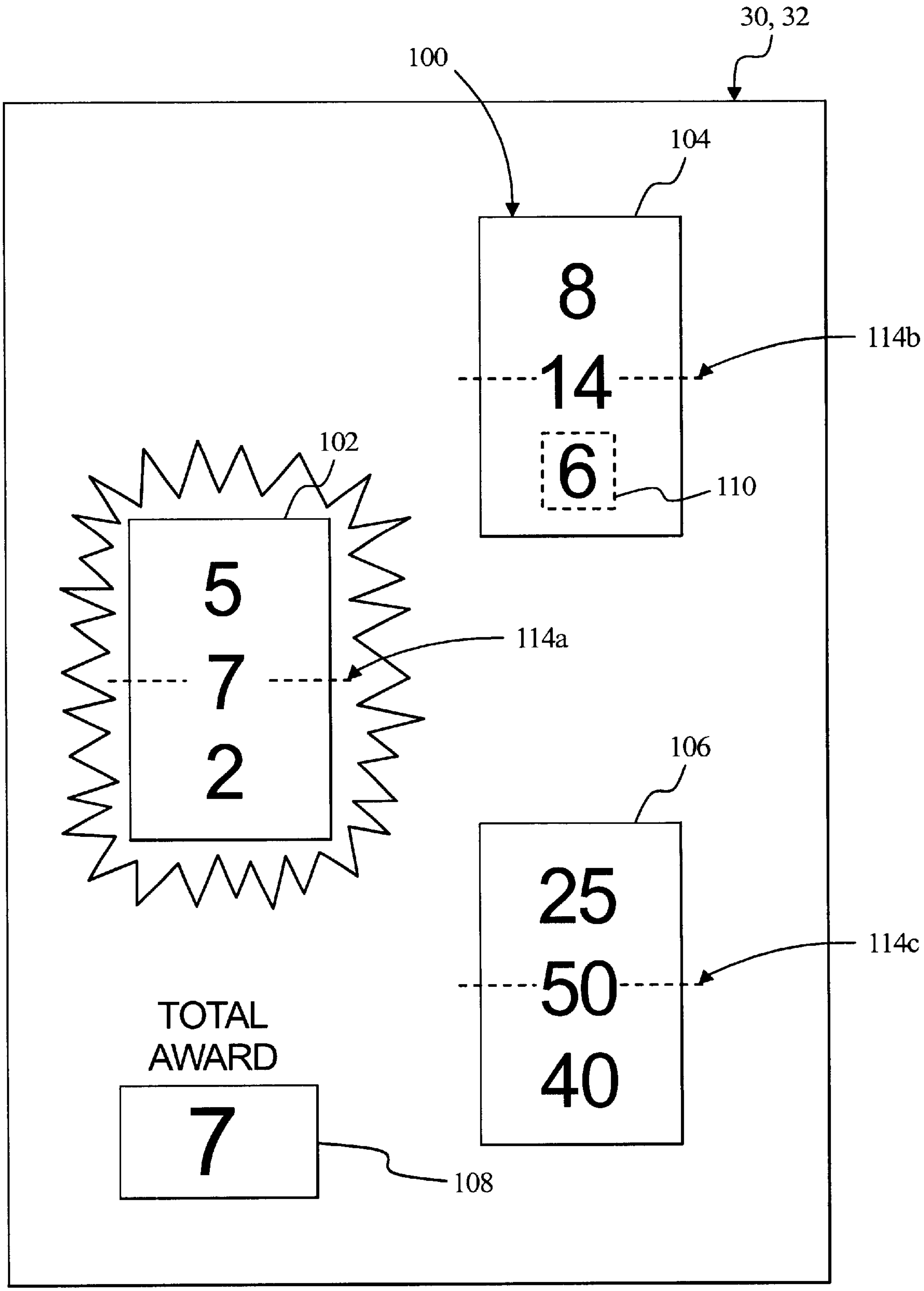
FIGS. 4A to 4G are enlarged elevation views of a display device illustrating an example where the gaming device activates three independent reels in a game.

In FIG. 4A, the gaming device begins the bonus game by activating all three reels 102, 104 and 106. Then the gaming device randomly selects and stops one of the reels. In another embodiment, the player selects which reel will stop. In this example, the gaming device stopped reel 102. The player obtained an award of seven as indicated on payline 114*a* on reel 102. The award of seven is transferred to the total award display as indicated by the total award display 108. All three reels 102, 104 and 106 are still activated because a terminator symbol 112 has not been indicated on a selected reel. The gaming device re-activates reel 102 and now all three reels 102, 104 and 106 are activated in the game.

Figure 4B:
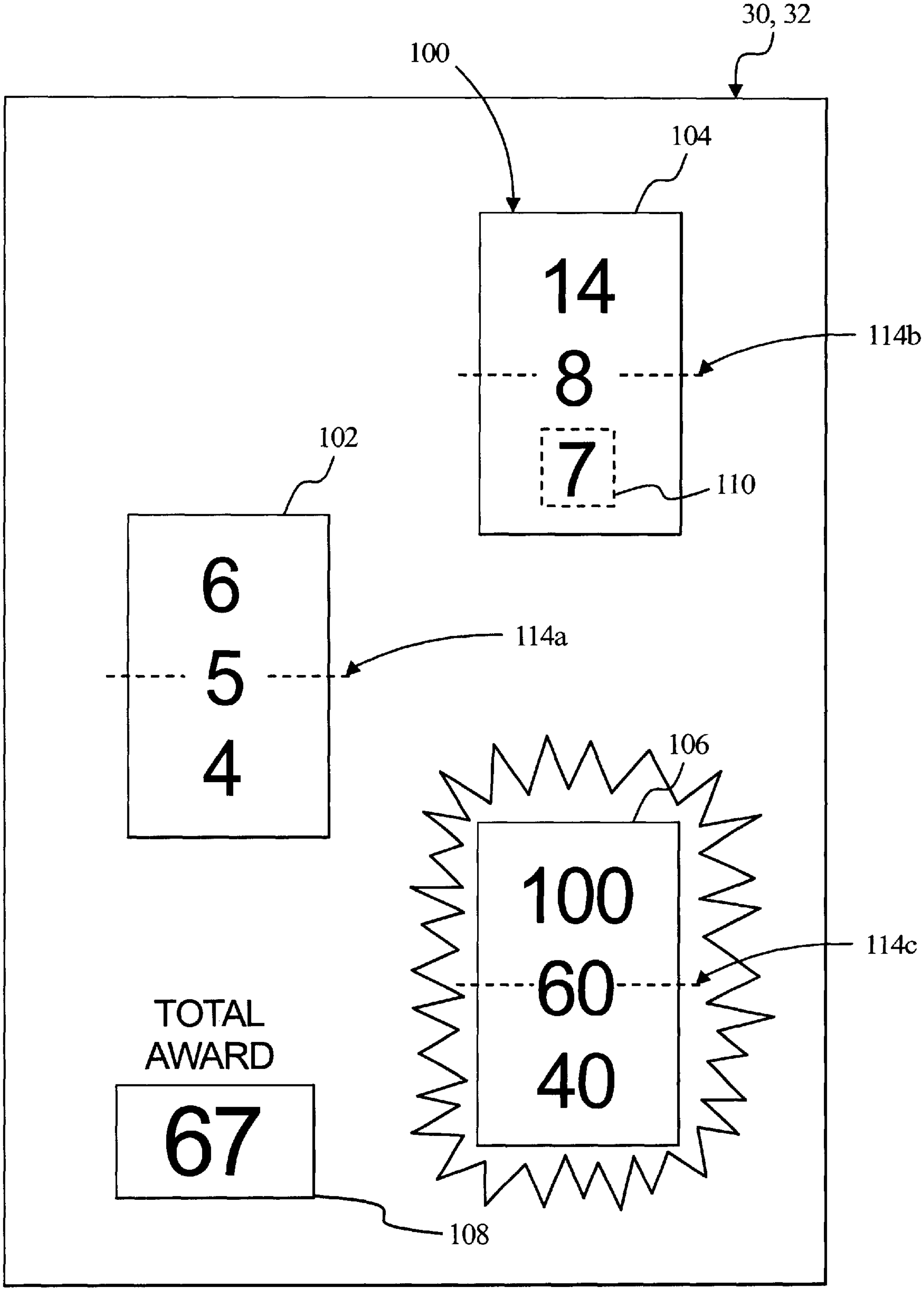

In FIG. 4B, the gaming device randomly stops reel 106. An award of sixty is indicated on payline 114*c* on reel 106. The award of sixty is transferred to the player's total award in total award display 108. The player's new total award is sixty-seven as indicated by the total award display 108. The gaming device re-activates reel 106 because a terminator symbol was not indicated on the reel. All three reels 102, 104 and 106 are still activated in the bonus game and the player still has an opportunity to obtain awards from each reel.

Figure 4C:
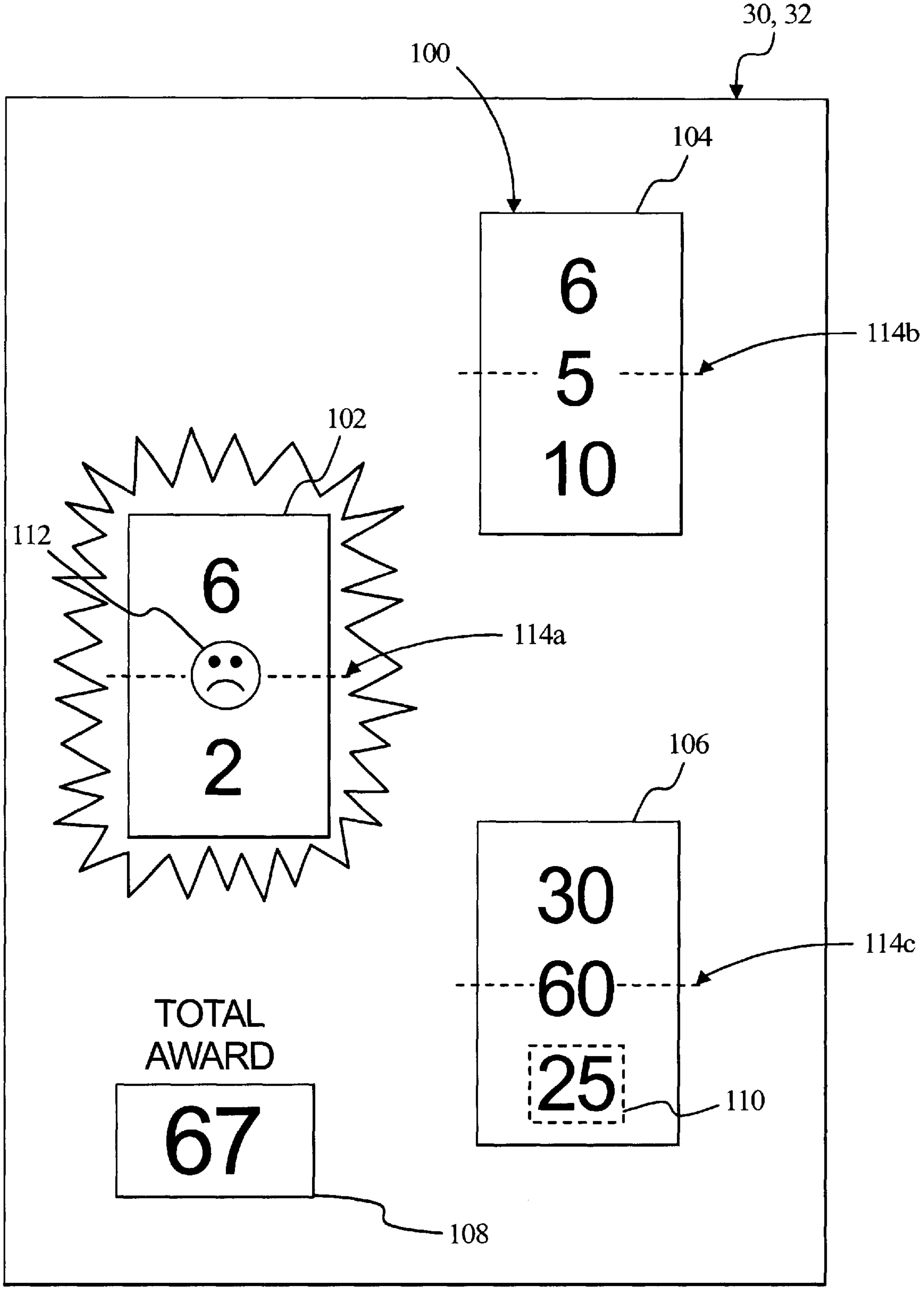

In FIG. 4C, the gaming device randomly selects reel 102 and stops that reel. A terminator symbol 112 is indicated on payline 114*a* on reel 102. The terminator symbol 112 deactivates reel 102. Therefore, the gaming device will not re-activate reel 102 again in this bonus game. Furthermore, the player will not receive any further awards from reel 102 during this bonus game. Reels 104 and 106 remain activated in the bonus game. Now, the player can only obtain awards from reels 104 and 106. The player's total award remains unchanged as indicated by the total award display 108.

Figure 4D:
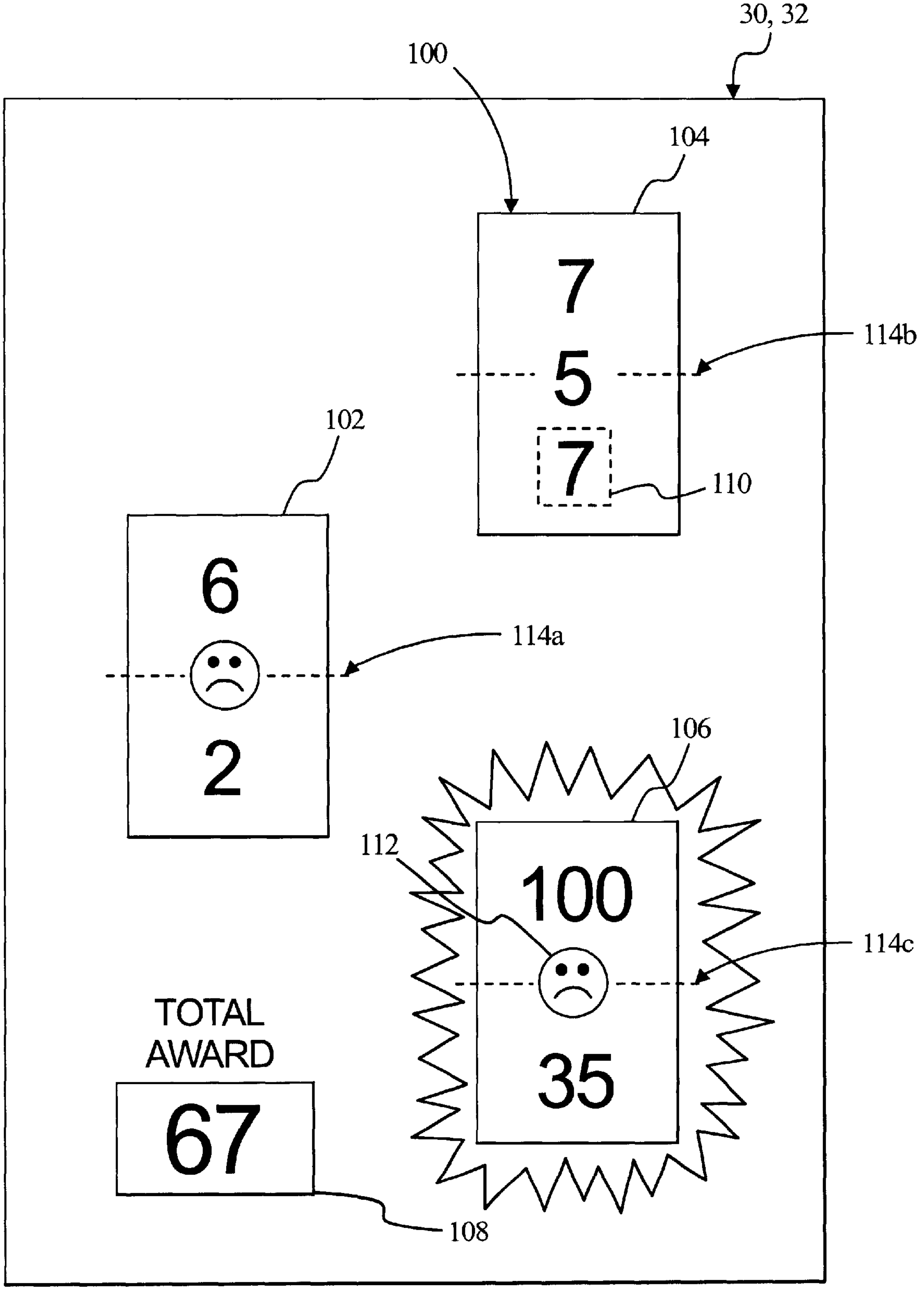

In FIG. 4D, reels 104 and 106 are activated and reel 102 is not activated because it was deactivated by a terminator symbol. The gaming device randomly selects reel 106 and stops that reel. Although reel 106 stops, reel 104 remains activated in the bonus game. A terminator symbol 112 is indicated on payline 114*c* on reel 106. The terminator symbol 112 causes the processor of the gaming device to deactivate reel 106. Therefore, the gaming device will not re-activate reel 106 during this bonus game. In this embodiment, the player does not receive an award for obtaining a terminator symbol 112 and therefore the player's total award of sixty-seven remains unchanged as indicated by the total award display 108. It should be appreciated that terminator symbol may be associated with an award. There is only one reel still activated, reel 104, in the bonus game. Thus, the player can only obtain awards from reel 104.

Figure 4E:
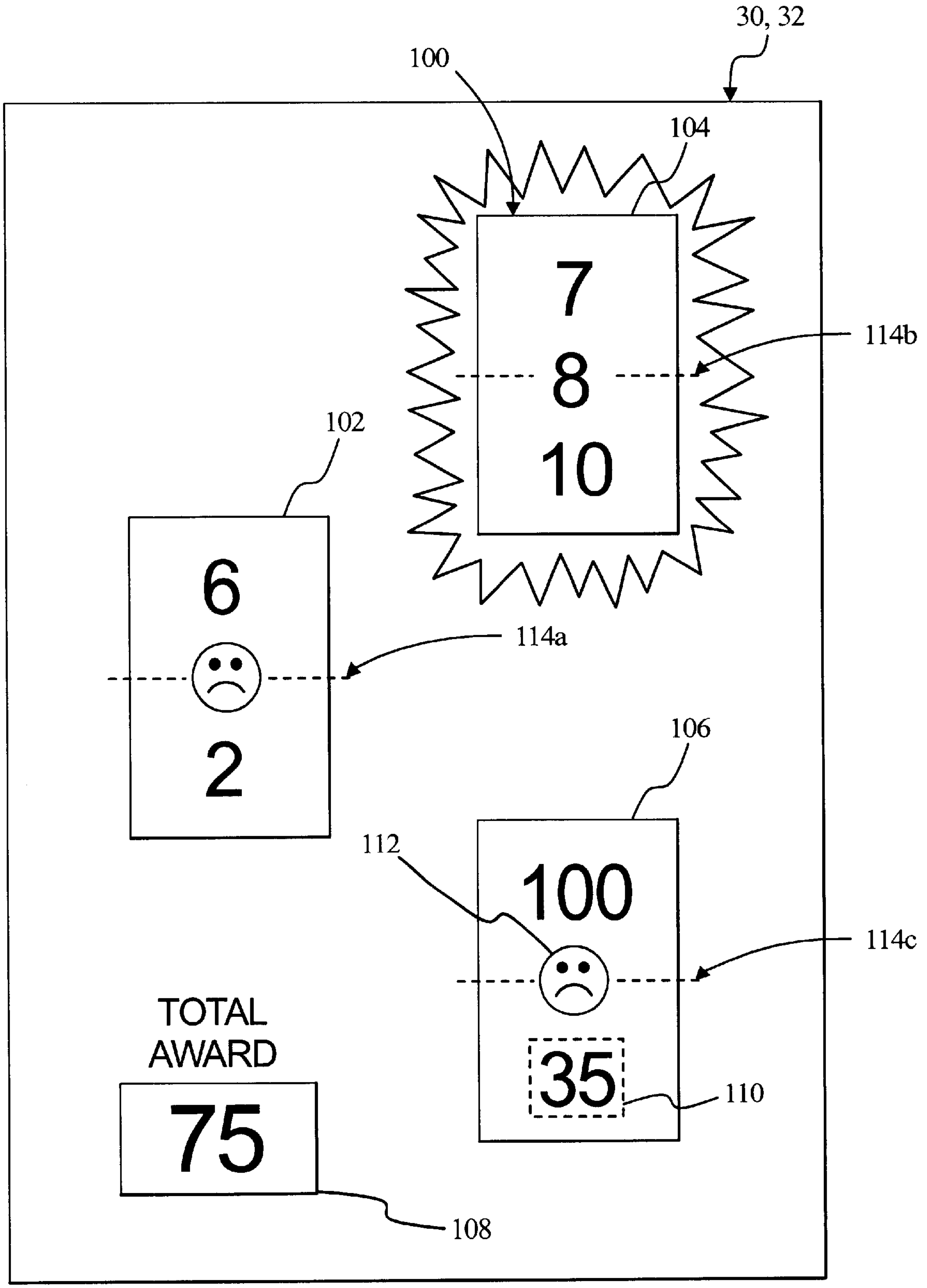

In FIG. 4E, the gaming device stops reel 104 because reel 104 is the only active reel remaining in the bonus game. The player obtains an award of eight as indicated on payline 114*b* on reel 104. The award of eight is transferred to the player's total award and the player's new total award is seventy-five as indicated by the total award display 108. The player did not receive a terminator symbol on the reel 104 and therefore the gaming device re-activates reel 104. The player has further opportunities to obtain or accumulate more awards.

Figure 4F:
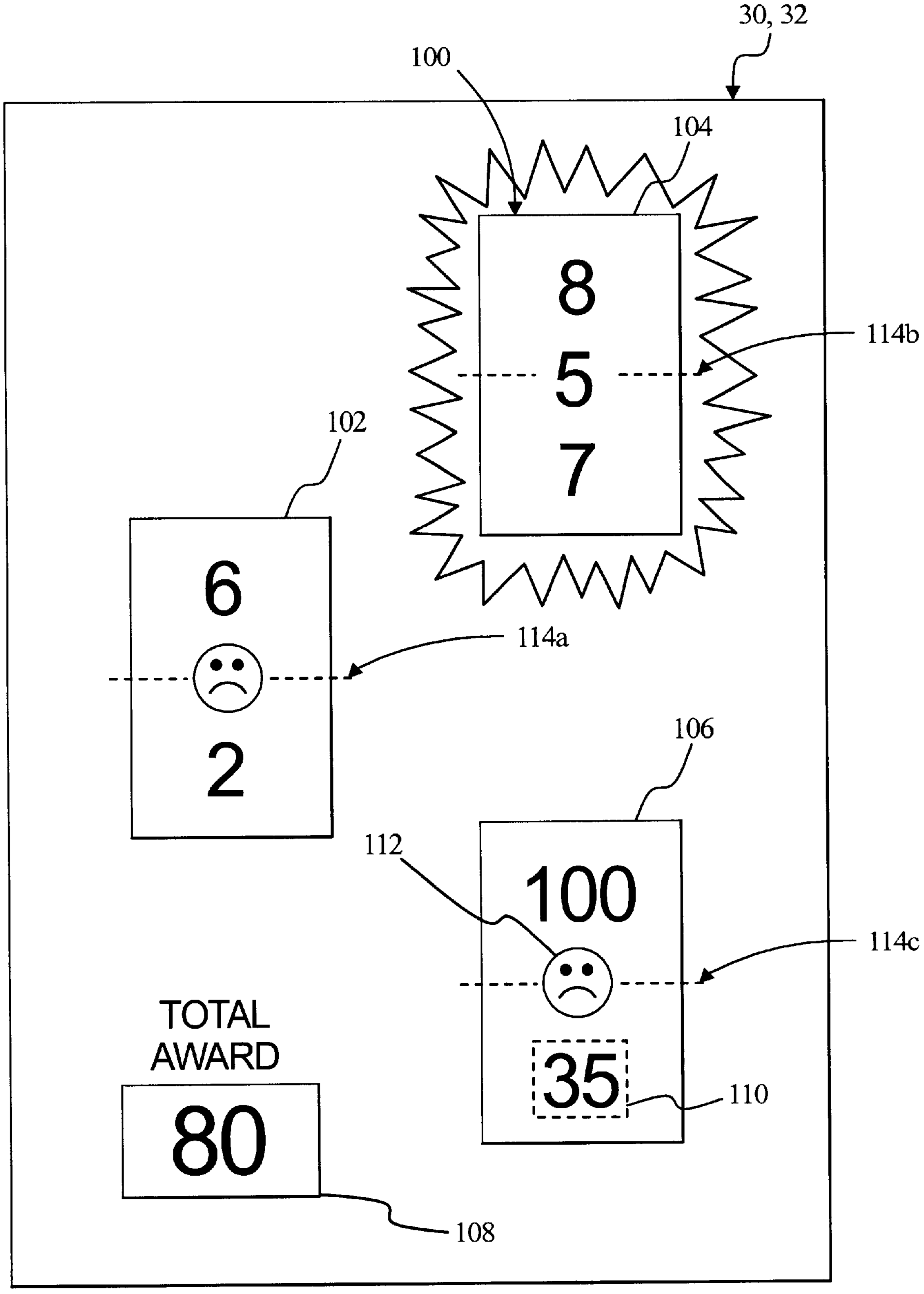

In FIG. 4F, the gaming device selects and stops reel 104. Again the gaming device selects reel 104 because reel 104 is the only active reel remaining in the bonus game. An award of five is indicated on payline 114*b* on reel 104. The award of five is transferred and added to the player's total award as indicated by the total award display 108. The player now has a total award of eighty. As indicated or shown in FIG. 4F, reels 102 and 106 are deactivated and therefore are not re-activated in the bonus game. The gaming device now re-activates reel 104.

Figure 4G:
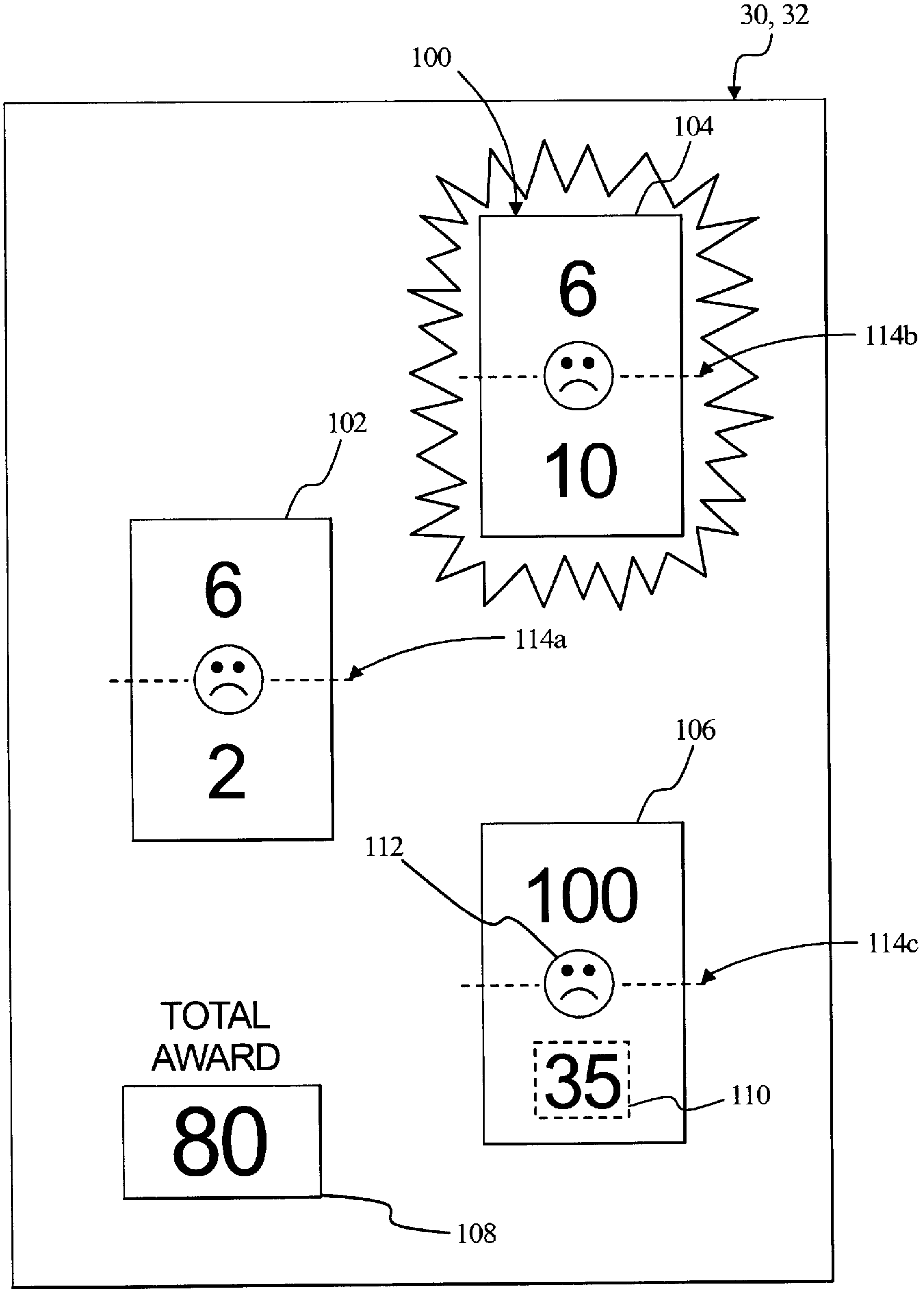

In FIG. 4G, the gaming device selects reel 104 and stops reel 104. A terminator symbol 112 is indicated on payline 114*b* on reel 104. The terminator symbol 112 causes the processor to deactivate reel 104 and therefore the gaming device will not re-activate reel 104 again in this bonus game. Furthermore, since all of the reels 102, 104 and 106 are deactivated, the bonus game ends. The player receives the total award of eighty as indicated in the total award display 108. The total award of eighty is transferred to a player's credit display in a conventional manner.

In a further embodiment, the reels 100 include a plurality of terminator symbols. The additional terminator symbols on each reel 100 make it more likely that a player will obtain a terminator symbol on a reel 100.

The awards symbols 110 and terminator symbols 112 on the reels 100 are preferably associated with probabilities of being indicated on the paylines. The probabilities may be any probabilities of being indicated by an award indicator as desired by the game implementor. In one embodiment, the probabilities associated with the award symbols 110 are higher than the probabilities associated with the terminator symbols 112. It should also be appreciated that the probabilities associated with the terminator symbols 112 may be higher than the probabilities associated with the award symbols 110. In another embodiment, the probability of being selected by the processor associated with the terminator symbol 112 is higher than the probability associated with one award symbol, a plurality of award symbols or all of the award symbols. Probabilities may also be associated with the awards. In this embodiment, the probability associated with one award value is higher than the probability associated with another award value. It should thus be appreciated that each reel may have a separate associated probability table.

In a further embodiment, the gaming device predetermines a total award to provide to the player. The gaming device then repeatedly indicates award symbols on the reels until the awards associated with the award symbols accumulate to equal the predetermined total award. A probability of being selected by the processor is preferably associated with each total award such that the probability of one total award is higher than the probability of another total award.

The reels 100 may also be associated with award values such that one reel may have relatively low award values and another reel may have relatively large award values. It should be appreciated that the reels may include any type of awards including low awards, large awards or any combination of low and large awards. In this embodiment, the awards are associated with activation probabilities such that the probability of a reel having relatively low awards being activated by the processor is higher than a reel having relatively large awards being activated by the processor. It should be appreciated that a reel having relatively large awards may be associated with a higher probability than the probability associated with a reel having relatively low awards.

In another embodiment, the gaming device does not activate all the reels at the beginning of a bonus game. Instead, the gaming device randomly selects and activates one of the reels. The player receives an award if an award symbol is indicated on the reel. If a terminating condition occurs, the reel is deactivated. Therefore, the gaming device will not activate or re-activate that reel again in the bonus game. The gaming device will then select and activate or re-activate one of the other reels remaining in the bonus game. In this embodiment, the gaming device only activates a selected reel. Therefore, the gaming device will continue to select and activate or re-activate one reel out of the plurality of reels until a terminating condition occurs on each selected reel or in the game. When a terminating condition occurs for each reel or in a bonus game, the reels are deactivated and the bonus game ends. The player receives the total award indicated by the total award display 108.

In another embodiment, the awards associated with the awards symbols on a reel increment after the reel is re-activated in a game. It should be appreciated that the award values may be increased, decreased or unchanged after the gaming device increments the awards on the reels. Furthermore, the gaming device may increment the award values by a predetermined amount or a random amount as desired by the game implementor.

In another embodiment, the terminating condition is determined by the processor based on deactivation probabilities associated with each reel. The deactivation probability is the probability that the processor will deactivate a reel. After a reel stops, the processor randomly deactivates that reel based on the deactivation probability for that reel. For example, a reel has a deactivation probability of 50%. Therefore, it is equally likely that the reel will be re-activated after being stopped by the processor as deactivated. If the deactivation probability is 80%, then it is more likely that the reel will be deactivated by the processor than activated or re-activated. Any suitable probabilities may be associated with a reel, a plurality of reels or all of the reels. It should be appreciated that a probability that a reel will be activated by the processor may also be associated with the reels. Once all of the reels in a game are deactivated, the game ends.

In a further embodiment, the deactivation probability increases after each activation of a reel. Thus, the player's chances of obtaining more award becomes more difficult as the game progresses. In another embodiment, the deactivation probability increases after a plurality of activations of each reel or a plurality of reels.

In another embodiment, the terminating condition is determined by the processor where each reel is associated with a predetermined number of activations. When there are no activations remaining for a reel, the processor deactivates the reel and that reel can no longer be re-activated during the game. When all of the reels are deactivated, the game ends. It should be appreciated that a pre-determined number of activations may be associated with one reel, a plurality of reels or all of the reels in a game. It should also be appreciated that a probability is associated with the number of activations such that the probability of one number of activations being selected by the processor is higher than the probability associated with another number of activations. Preferably, the number of activations associated with a reel or reels is not displayed or shown to the player. However, it should be appreciated that the number of activations may be displayed to the player as desired.

In a further embodiment, the processor associates a pre-determined number of activations with at least one reel where an award is provided to a player if the predetermined number of activations occurs for that reel. In another embodiment, the processor associates a predetermined number of activations with a plurality of reels such that the gaming device provides an award to the player if the pre-determined number of activations occurs for the plurality of reels. In still a further embodiment, the processor associates a pre-determined number of activations with all of the reels in a game so the player receives an award if the pre-determined number of activations occurs for all of the reels. It should be appreciated that a probability of being selected by the processor is associated with the number of activations such that the probability associated with one number of activations is higher than the probability associated with another number of activations.

In another embodiment, a number of activations is determined by the processor and associated with at least one reel in the bonus game. The number of activations is preferably associated with a probability of being selected by the processor such that the probability associated with one number of activations is higher than the probability associated with another number of activations. The number of activations may be associated with one reel, a plurality of reels or all of the reels. Furthermore, the number of activations may be the same for each reel or different for each reel. The processor deactivates a reel or reels, when the number of activations occurs for that reel or reels. When all of the reels are deactivated the bonus game ends and the player receives the total award for the bonus game.

In a further embodiment, a probability of deactivation is associated with at least one reel where the processor determines whether to deactivate a reel based on the probabilities. The deactivation probability may be the same or different for each reel. In one embodiment, the deactivation probability increases after each activation of a reel or after a plurality of activations of a reel or reels. For example, the deactivation probability may be 50% for all the reels in a bonus game. After one reel is deactivated, the deactivation probability increases to 60% for the remaining reels. The deactivation probability continues to increase until all of the reels are deactivated. Therefore, it becomes more difficult to obtain awards in the bonus game as the game progresses. It should be appreciated that the activation probability may increase by a pre-determined amount or a random amount.

In another embodiment, a deactivation probability and a number of activations is associated with a reel, a plurality of reels or all of the reels. In this embodiment, the player receives an award if the number of activations occurs for the reel, plurality of reels or all of the reels before the reel or reels are deactivated by the processor.

It should be appreciated that the present invention may include one or more activators or activation initiators in communication with the processor which enables the player to select which reel or reels to activate, and to stop the activation of the reels.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming device comprising:

at least two independently activated reels;

a plurality of award symbols on each reel;

a plurality of awards associated with said award symbols;

at least one award indicator associated with each of said reels;

a terminating condition associated with at least one of said reels; and a processor for independently activating each of said reels, for independently stopping each of said reels, for providing a player any award associated with said award symbol indicated on said stopped reel, for deactivating at least one of said reels when a terminating condition occurs for said reel and for independently re-activating said stopped reel when said reel is not deactivated.

2. The gaming device of claim 1, wherein at least one terminating condition is associated with each reel.

3. The gaming device of claim 1, which includes an activation initiator in communication with the processor.

4. The gaming device of claim 1, wherein the terminating condition is at least one terminator symbol on said reels, and wherein said reel is deactivated when said terminator symbol is indicated on said reel.

5. The gaming device of claim 1, which includes a plurality of award indicators associated with at least one of said reels.

6. The gaming device of claim 1, which includes a display device for displaying said reels and wherein said processor communicates with said display device.

7. The gaming device of claim 1, which includes a deactivation probability associated with at least one reel, wherein the processor randomly determines to deactivate the reel based on the deactivation probability.

8. The gaming device of claim 7, wherein the deactivation probability associated with one reel is higher than the deactivation associated with another reel.

9. The gaming device of claim 1, which includes an occurrence probability associated with each terminating condition, wherein the processor randomly determines whether said terminating condition occurs based on said occurrence probability.

10. The gaming device of claim 9, wherein the occurrence probability associated with each terminating condition increases after each activation of said reels where the terminating condition does not occur.

11. The gaming device of claim 9, wherein the occurrence probability associated with each terminating condition increases after a plurality of activations of said reels where the terminating condition does not occur.

12. The gaming device of claim 1, which includes an indication probability associated with each award symbol and an occurrence probability associated with each terminating condition, wherein the processor determines whether one of the award symbols is indicated or the terminating condition occurs based on said probabilities.

13. The gaming device of claim 12, wherein the occurrence probability is higher than the indication probabilities associated with all of the award symbols on one of the reels.

14. The gaming device of claim 12, wherein the occurrence probability is higher than the indication probabilities associated with a plurality of the award symbols on one of the reels.

15. The gaming device of claim 1, wherein said awards have probabilities of being provided to said player, wherein the processor determines the award symbols based on said probabilities.

16. The gaming device of claim 15, wherein a plurality of said probabilities are different.

17. The gaming device of claim 1, which includes a plurality of potential total awards, wherein said processor randomly selects one of said total awards and repeatedly indicates award symbols on said reels until said awards associated with said award symbols accumulate to said total award.

18. The gaming device of claim 17, wherein said total awards are associated with probabilities such that one of said total awards has a higher probability of being selected by said processor than another of said total awards.

19. The gaming device of claim 1, wherein each reel is associated with pre-determined awards.

20. The gaming device of claim 1, wherein each reel is associated with randomly determined awards.

21. The gaming device of claim 1, wherein said awards associated with one of the reels increment by a predetermined amount each time said reel re-activates.

22. The gaming device of claim 1, wherein said awards associated with one of the reels increment by a randomly determined amount each time said reel re-activates.

23. The gaming device of claim 1, wherein said award indicator is at least one payline.

24. The gaming device of claim 1, wherein the terminating condition includes a number of activations associated with each reel and wherein each reel deactivates when the number of activations occurs for said reel.

25. The gaming device of claim 24, wherein the number of activations is associated with a probability of being selected by the processor such that one number of activations has a higher probability of being selected than another number of activations.

26. The gamming device of claim 1, wherein the terminating condition includes a total number of activations, wherein at least one said reels deactivates when the total number of activations occurs.

27. The gaming device of claim 26, wherein said total number of activations is associated with a probability of being selected by the processor such that one total number of activations has a higher probability of being selected by said processor than another total number of activations.

28. The gaming device of claim 1, which includes a pre-determined total number of activations, wherein the processor provides the player with an award if the pre-determined total number of activations occurs.

29. The gaming device of claim 28, wherein the pre-determined total number of activations is associated with a probability of being selected by the processor such that one pre-determined total number of activations has a higher probability of being selected by said processor than another pre-determined total number of activations.

30. The gaming device of claim 1, which includes an award associated with said terminating condition.

31. A gaming device having a bonus game comprising:

at least two independently activated reels;

a plurality of award symbols on each reel;

a plurality of awards associated with said award symbols;

at least one terminator symbol on at least one of said reels;

an award indicator associated with each of said reels; and a processor for independently activating each of said reels, for independently stopping each of said reels, for providing a player any award associated with said award symbol indicated on said stopped reel, for deactivating at least one of said reels when the terminator symbol is indicated on said reel and for independently re-activating said stopped reel when said reel is not deactivated.

32. The gaming device of claim 31, which includes an activation initiator in communication with the processor.

33. The gaming device of claim 31, which includes a plurality of terminator symbols on at least one of said reels.

34. The gaming device of claim 31, which includes a plurality of award indicators associated with at least one of said reels.

35. The gaming device of claim 31, which includes a display device for displaying said reels, wherein said processor communicates with said display device.

36. The gaming device of claim 31, which includes a plurality of activated reels.

37. The gaming device of claim 31, which includes an indication probability associated with each symbol, wherein the processor determines the symbol indicated based on said indication probabilities.

38. The gaming device of claim 37, wherein a plurality of said indication probabilities are the same.

39. The gaming device of claim 37, wherein an occurrence probability associated with said terminator symbol on one of the reels is higher than the indication probability associated with at least one award symbol on one of the reels.

40. The gaming device of claim 39, wherein the occurrence probability associated with said terminator symbol on one of the reels is higher than the indication probabilities associated with all of the award symbols on one of the reels.

41. The gaming device of claim 31, wherein said awards have probabilities of being provided to said player, wherein the processor determines the award symbols based on said probabilities.

42. The gaming device of claim 41, wherein a plurality of said probabilities are different.

43. The gaming device of claim 31, wherein said award indicator is at least one payline.

44. The gaming device of claim 31, wherein said processor deactivates all of said reels when at least one terminator symbol is indicated on one of said reels.

45. The gaming device of claim 31, wherein the terminator symbol is associated with an award.

46. A gaming device comprising:

at least two independently activated reels;

a plurality of award symbols on each of said reels;

a plurality of awards associated with said award symbols;

at least one terminating condition associated with each of said reels;

at least one independent award indicator associated with each of said reels;

an indication probability associated with each award symbol, wherein one award symbol has a higher probability of being indicated than another of said award symbols;

an occurrence probability associated with each terminating condition, wherein one terminating condition has a higher probability of occurring than another of said terminating conditions; and a processor for independently activating each of said reels, for independently stopping each of said reels, for providing a player an award associated with said award symbol indicated on said stopped reel based on the indication probabilities, for de-activating said reel when the terminating condition occurs on said reel based on the occurrence probabilities, and for independently re-activating said stopped reel when said reel is not deactivated.

47. The gaming device of claim 46, wherein the occurrence probability associated with said terminating condition is higher than the indication probability associated with at least one award symbol.

48. The gaming device of claim 46, wherein the occurrence probability associated with said terminating condition is higher than the indication probabilities associated with a plurality of the award symbols.

49. The gaming device of claim 46, wherein the occurrence probability associated with said terminating condition is higher than the indication probabilities associated with all of the award symbols.

50. A gaming device comprising:

at least two independently activated reels;

a plurality of award symbols on each of said reels;

a plurality of low value awards associated with said award symbols on at least one of said reels;

a plurality of large value awards associated with said award symbols on at least one of said reels;

an activation probability associated with said reel having low value awards and an activation probability associated with said reel having large value awards, wherein the probability of being activated associated with the reels having large value awards is lower than the probability associated with said reels having low value awards;

a terminating condition associated with each of said reels;

an award indicator associated with each of said reels; and a processor for independently activating each of said reels, for independently stopping each of the reels, for providing a player any award associated with said award symbol indicated on said stopped reel, for de-activating said reel when the terminating condition occurs on said reel and for independently re-activating said stopped reel when the reel is not deactivated.

51. A gaming device comprising:

a plurality of independently activated reels;

a plurality of award symbols on each reel;

a plurality of awards associated with said award symbols;

an award indicator associated with each of said reels;

a terminating condition;

a processor for independently activating each of said reels, for independently stopping each of said reels, for providing a player any award associated with said award symbol indicated on said stopped reel, for deactivating at least one of said reels when said terminating condition occurs and for independently re-activating said stopped reel when said reel is not deactivated; and an occurrence probability associated with the terminating condition, wherein the processor determines whether said terminating condition will occur during said reel activations based on said occurrence probability.

52. The gaming device of claim 51, wherein the occurrence probability is the same for each reel.

53. The gaming device of claim 51, wherein the occurrence probability is different for each reel.

54. The gaming device of claim 51, wherein the occurrence probability is different for a plurality of reels.

55. The gaming device of claim 51, wherein the occurrence probability increases after each activation of the reels.

56. The gaming device of claim 51, wherein the occurrence probability increases after a plurality of activations of the reels.

57. The gaming device of claim 51, wherein the occurrence probability increases after each occurrence of the terminating condition on one of said reels.

58. The gaming device of claim 51, wherein the occurrence probability increases after a plurality of terminating conditions occur on said reels.

59. A gaming device comprising:

a plurality of independently activated reels;

a plurality of award symbols on each reel;

a plurality of awards associated with said award symbols;

at least one award indicator associated with each of said reels;

a number of activations; and a processor for randomly determining the number of activations, for associating the number of activations with at least one reel, for independently activating each of said reels, for independently stopping each of said reels, for providing a player any award associated with said award symbol indicated on said stopped reel, for deactivating at least one of said reels when the number of activations has occurred for said reel or said reels and for independently re-activating said stopped reel when said reel is not deactivated.

60. The gaming device of claim 59, which includes a probability of being determined by the processor associated with the number of activations, wherein said probability associated with one number of activations is higher than another number of activations.

61. The gaming device of claim 59, wherein the number of activations is the same for each reel.

62. The gaming device of claim 59, wherein the number of activations is different for each reel.

63. The gaming device of claim 59, wherein the number of activations is different for a plurality of reels.

64. A gaming device comprising:

a plurality independently activated reels;

a plurality of award symbols on each reel;

a plurality of awards associated with said award symbols;

at least one award indicator associated with each of said reels;

a deactivation probability associated with at least one reel; and a processor for independently activating each of said reels, for independently stopping each of said reels, for providing a player any award associated with said award symbol indicated on said stopped reel, for randomly deactivating at least one of said reels based on the deactivation probability for that reel and for independently re-activating said stopped reel when said reel is not deactivated.

65. The gaming device of claim 64, wherein the deactivation probability is the same for each reel.

66. The gaming device of claim 64, wherein the deactivation probability is different for each reel.

67. The gaming device of claim 64, wherein the deactivation probability is different for a plurality of reels.

68. The gaming device of claim 64, wherein the deactivation probability increases after each activation of one of the reels.

69. The gaming device of claim 64, wherein the deactivation probability increases after a plurality of activations of one of the reels.

70. The gaming device of claim 64, which includes a number of activations associated with each reel.

71. The gaming device of claim 70, wherein an award is provided to a player when the number of activations occurs for one of the reels.

72. The gaming device of claim 64, which includes a number of activations associated with a plurality of said reels.

73. The gaming device of claim 72, wherein an award is provided to a player when the number of activations occurs for said reels.

74. The gaming device of claim 64, which includes a number of activations associated with all of the reels.

75. The gaming device of claim 74, wherein an award is provided to a player when the number of activations occurs for all of the reels.

76. A gaming device having a bonus game comprising:

a plurality of independently activated reels;

a plurality of award symbols on each reel;

a plurality of awards associated with said award symbols;

at least one award indicator associated with each of said reels;

a number of activations associated with each reel; and a processor for randomly determining the number of activations for each reel, for independently activating each of said reels, for independently stopping each of said reels, for providing a player any award associated with said award symbol indicated on said stopped reel, for deactivating said stopped reel when the number of activations has occurred for that reel and for independently re-activating said stopped reel when said reel is not deactivated.

77. The gaming device of claim 76, which includes a probability of being determined by the processor associated with the number of activations wherein the probability associated with one number of activations is higher than another number of activations.

78. The gaming device of claim 76, wherein the number of activations is the same for each reel.

79. The gaming device of claim 76, wherein the number of activations is different for each reel.

80. The gaming device of claim 76, which includes a number of activations associated with a plurality of reels, wherein the processor deactivates said reels when the number of activations has occurred for the reels.

81. The gaming device of claim 76, which includes a number of activations associated with all of said reels, wherein the processor deactivates all of said reels when the number of activations has occurred for the reels.

82. A method for operating a gaming device, said method comprising the steps of:

(a) independently activating a plurality of reels, each including at least one award symbol and at least one terminating condition;

(b) independently stopping one of said reels;

(c) providing an award to a player if an award symbol is indicated on the stopped reel;

(d) deactivating said reel if a terminating condition occurs;

(e) re-activating said reel if said terminating condition does not occur; and (f) repeating steps (a) through (e) until each of said reels is de-activated.

83. The method of claim 82, wherein said award symbols are associated with probabilities of being indicated and at least one terminating condition is associated with a probability of occurring such that each of said award symbols has a lower probability of being indicated than the probability of occurring associated with said terminating condition.

84. The method of claim 82, wherein said award symbols are associated with probabilities of being indicated and at least one terminating condition is associated with a probability of occurring such that each of said award symbols has a higher probability of being indicated than the probability of occurring associated with said terminating condition.

* * * * *

UNITED STATES PATENT AND TRADEMARK OFFICE
CERTIFICATE OF CORRECTION

PATENT NO. : 6,634,945 B2
DATED : October 21, 2003
INVENTOR(S) : Glavich et al.

It is certified that error appears in the above-identified patent and that said Letters Patent is hereby corrected as shown below:

Title page,
Item [56], References Cited, OTHER PUBLICATIONS, "Fortune Cook Advertisement" to -- Fortune Cookie Advertisement --.

Column 2,
Line 31, change "accumulated awards by" to -- awards accumulated by --.
Line 57, change "symbols at" to -- symbols and at --.

Column 3,
Line 2, change "is not limited," to -- is not limited to, --.

Column 8,
Line 57, change "appreciated however," to -- appreciated, however, that --.
Line 65, change "display" to -- displayed --.

Column 11,
Line 50, change "awards symbols" to -- award symbols --.

Column 12,
Line 9, change "award" to -- awards --.

Column 13,
Line 67, change "deactivation associated" to -- deactivation probability associated --.

Column 14,
Line 64, change "gamming" to -- gaming --.
Line 66, change "one said reels" to -- one of said reels --.

Column 17,
Line 66, "a plurality independently" to -- a plurality of independently --.

UNITED STATES PATENT AND TRADEMARK OFFICE

CERTIFICATE OF CORRECTION

PATENT NO. : 6,634,945 B2
DATED : October 21, 2003
INVENTOR(S) : Glavich et al.

It is certified that error appears in the above-identified patent and that said Letters Patent is hereby corrected as shown below:

Column 18,
Lines 29, 35 and 40, “a player” to -- the player --.

Signed and Sealed this

Twentieth Day of January, 2004

JON W. DUDAS
*Acting Director of the United States Patent and Trademark Office*